US008200670B1

(12) United States Patent
Flaster et al.

(10) Patent No.: US 8,200,670 B1
(45) Date of Patent: Jun. 12, 2012

(54) EFFICIENT DOCUMENT CLUSTERING

(75) Inventors: Michael Flaster, Tenafly, NJ (US); Eran Gabber, Summit, NJ (US); Ruoming Pang, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 288 days.

(21) Appl. No.: 12/262,846

(22) Filed: Oct. 31, 2008

(51) Int. Cl.
*G06F 7/00* (2006.01)
(52) U.S. Cl. ........................................ 707/737; 707/602
(58) Field of Classification Search ................... 707/737
See application file for complete search history.

(56) References Cited

U.S. PATENT DOCUMENTS

| 2005/0203970 | A1 * | 9/2005 | McKeown et al. | 707/203 |
| 2006/0294101 | A1 * | 12/2006 | Wnek | 707/7 |
| 2007/0150468 | A1 * | 6/2007 | Goldman et al. | 707/5 |

* cited by examiner

*Primary Examiner* — Fazlul Quader
(74) *Attorney, Agent, or Firm* — Fish & Richardson P.C.

(57) ABSTRACT

Methods, systems, and apparatus, including computer program products, for clustering documents. A plurality of documents are identified from a set of documents, where the identified documents have the same top N terms by term frequency score for an integer N. A pattern string that is satisfied by at least a subset of the identified documents is identified. A document cluster is formed from at least the subset of the identified documents.

32 Claims, 4 Drawing Sheets

US 8,200,670 B1

EFFICIENT DOCUMENT CLUSTERING

TECHNICAL FIELD

This specification is related generally to document processing.

BACKGROUND

Clustering is a popular technique in document processing. A clustering routine can be used to gather documents that have some common characteristic into a group or a cluster. By clustering documents with a common characteristic into a group, processing can be applied to a sample of documents in the group rather than to all documents in the group. Further, information determined from the documents in the group, or the sample of documents, can be applied to later documents that are clustered into the same group. Conventional algorithms and techniques for clustering documents, however, can take a long time (e.g., $O(n^2)$) to create or populate the clusters. This can make clustering cumbersome for very large sets of documents.

SUMMARY

In general, one aspect of the subject matter described in this specification can be embodied in methods that include the actions of identifying a plurality of documents, from a set of documents, whose respective top N terms by term frequency score are the same, where N is an integer; identifying a pattern string that is satisfied by at least a subset of the identified documents; and forming a document cluster from at least the subset of the identified documents. Other embodiments of this aspect include corresponding systems, apparatus, computer program products, and computer readable media.

Particular embodiments of the subject matter described in this specification can be implemented to realize one or more of the following advantages. Clustering of documents can be performed more efficiently. For example, clustering of documents takes $O(n)$ time.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Example Document Processing Environment

Figure 1:
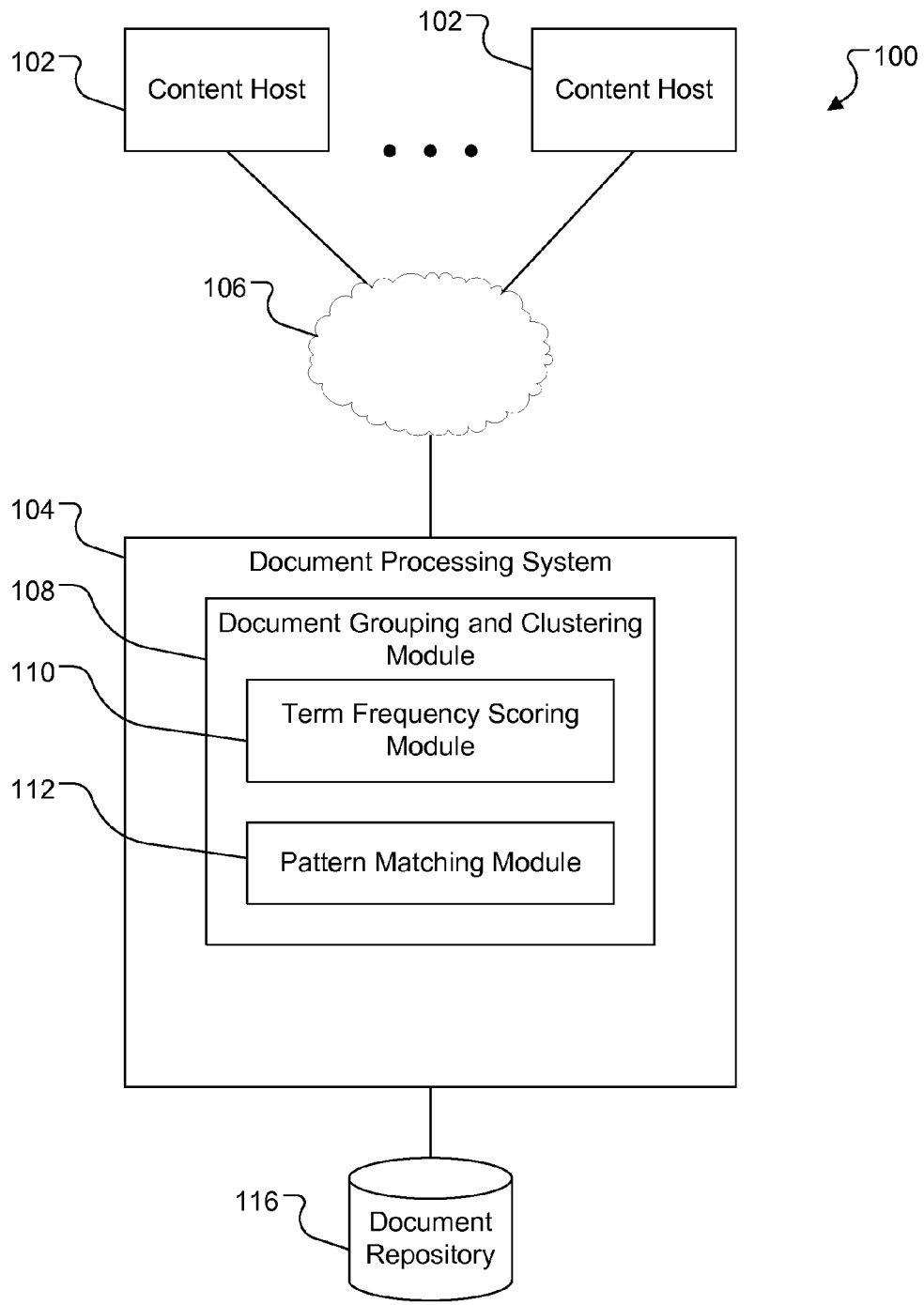
FIG. 1 is a block diagram illustrating an example document processing environment.

FIG. 1 illustrates an example document processing environment 100. The environment 100 includes one or more content hosts 102 and a document processing system 104. Document processing system 104 can be in communication with the content hosts 102 over one or more networks 106, which can include, for example, local area networks, wide area networks, intranets, wireless networks, and the Internet.

A content host 102 hosts one or more documents. In some implementations, the content hosts 102 are web servers hosting websites. A website can have one or more documents. A document can be located by its Universal Resource Locator (URL). The documents can include web pages written in the Hypertext Markup Language (HTML) and/or any other suitable language. A web page can include, among other things, text and graphics. Other types of documents include, for example, images, audio clips, and video clips.

A document can include or have associated therewith one or more terms. A term can be, for example, a symbol, a character, a word, a phrase, or any combination thereof.

Document processing system 104 can receive documents from content hosts 102 (or otherwise identify relevant documents) and can processes the received/identified documents. In some implementations, the document processing system 104 crawls for documents at the content hosts 102 using, for example, one or more conventional crawlers. The processing of the documents can include any number of operations. In some implementations, the document processing operations include clustering of documents. In some implementations, the document processing system 104 can store copies of documents received from content hosts in a document repository 116.

The clustering operations can be performed, for example, by a document grouping and clustering module 108. The document grouping and clustering module 108 can group documents according to a similarity criterion. In some implementations, the similarity criterion is that two documents are considered to be similar and thus can be grouped if the two documents have in common terms that are scored highly based on a measure of term frequency. The document grouping and clustering module 108 can include a term frequency module 110 for scoring terms in documents based on a measure of term frequency.

For a group of documents that have in common terms that are scored highly based on a measure of term frequency, a pattern matching module 112 can determine a pattern string for at least a subset of the documents in the group. In some implementations, the pattern string matches the URLs of at least a subset of the documents in the group. The pattern string can be used to identify the group of documents.

Example Document Clustering Process

Figure 2:
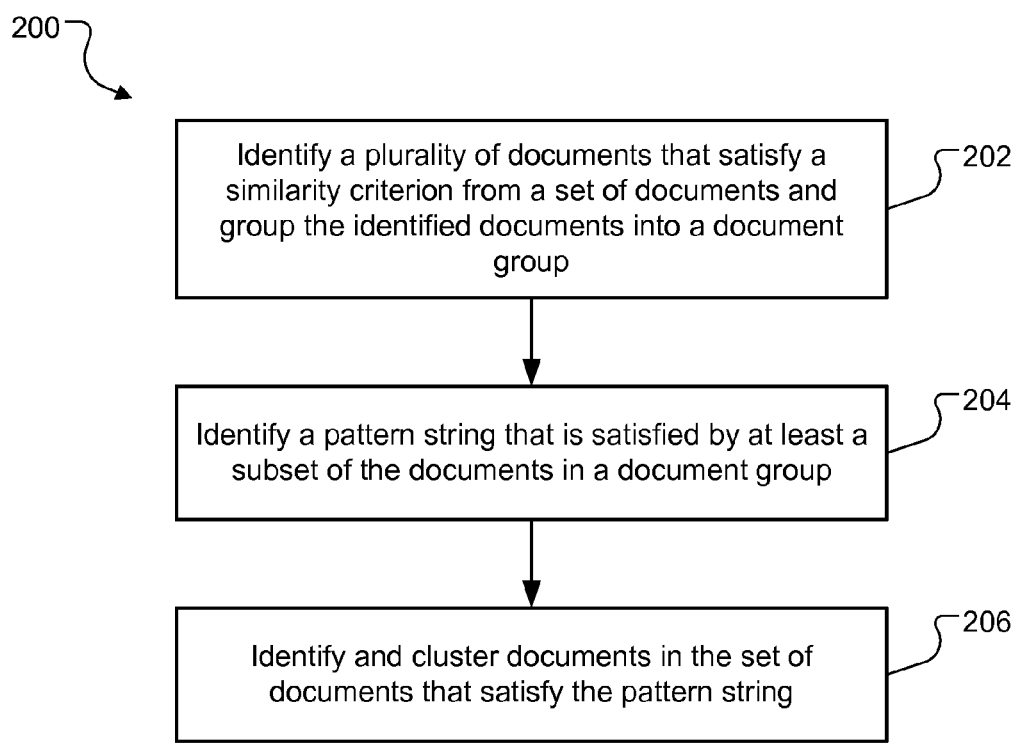
FIG. 2 is a flow diagram illustrating an example process for clustering documents.

FIG. 2 illustrates an example process 200 for clustering documents. For convenience, process 200 will be described in reference to a system (e.g., document processing system 104) that performs the process.

A plurality of documents, among a set of documents, that satisfy a similarity criterion is identified and grouped into a document group (202). In some implementations, a similarity criterion is that, when terms in respective documents are ordered based on a measure of term frequency (e.g., a term frequency score), a document has the same top N terms (or within a predetermined percentage of the same) in the ordering as another document, where N is an integer having a value of 1 or greater. A term frequency scoring module 110 in document grouping and clustering module 108 can score terms in documents using a scoring scheme within which term frequency is an input. Documents that have the same top N terms by term frequency score can be grouped together.

One or more document groups can be formed from a set of documents. In some implementations, the set of documents is one or more documents (e.g., webpages) from a website. The scoring of terms and grouping of documents are described in further detail below in reference to FIG. 3.

A pattern string that is satisfied by at least a subset of the documents in a document group is identified (204). In some implementations, a pattern matching module 122 can identify a pattern that matches the URLs of one or more of the documents in a document group formed in accordance with step 202 above. The pattern string can be determined in accordance with a pattern language. One or more patterns can be determined for a document group, and patterns can be determined for each of multiple document groups. In some implementations, the pattern string is identified based on a Minimum Description Length (MDL) principle such that the identified pattern also matches at least a minimum number of documents.

A document cluster is formed from the documents in the set of documents that satisfies the identified pattern string (206). In some implementations, documents in the set of documents, including those documents in the document group based on which the pattern string was identified, as well as documents from the same content host (e.g., website) that are not in the document group, that satisfy the pattern string are identified and grouped into a cluster. The documents in the set of documents that do not satisfy the pattern string, including those documents in the document group based on which the pattern string was identified that do not satisfy the pattern string, is put back (e.g., returned or re-associated with) into the set of documents.

In some implementations, after step 206, process 200 is repeated with the remainder of the set of documents and additional document clusters can be formed. The iterations of process 200 continue until no document groups that meet the threshold minimum size can be formed. In some implementations, a "catch-all" pattern string is applied to the remaining documents that are not in a cluster; the remaining documents are clustered under the catch-all pattern string. Thus, after the iterations, each of the documents in the set of documents is associated with a pattern string.

In some implementations, documents are processed for grouping and clustering per website. That is, the documents (e.g., web pages) of a website are treated as a distinct set of documents and are grouped and clustered amongst themselves, separately from documents from other websites.

Document Grouping

Figure 3:
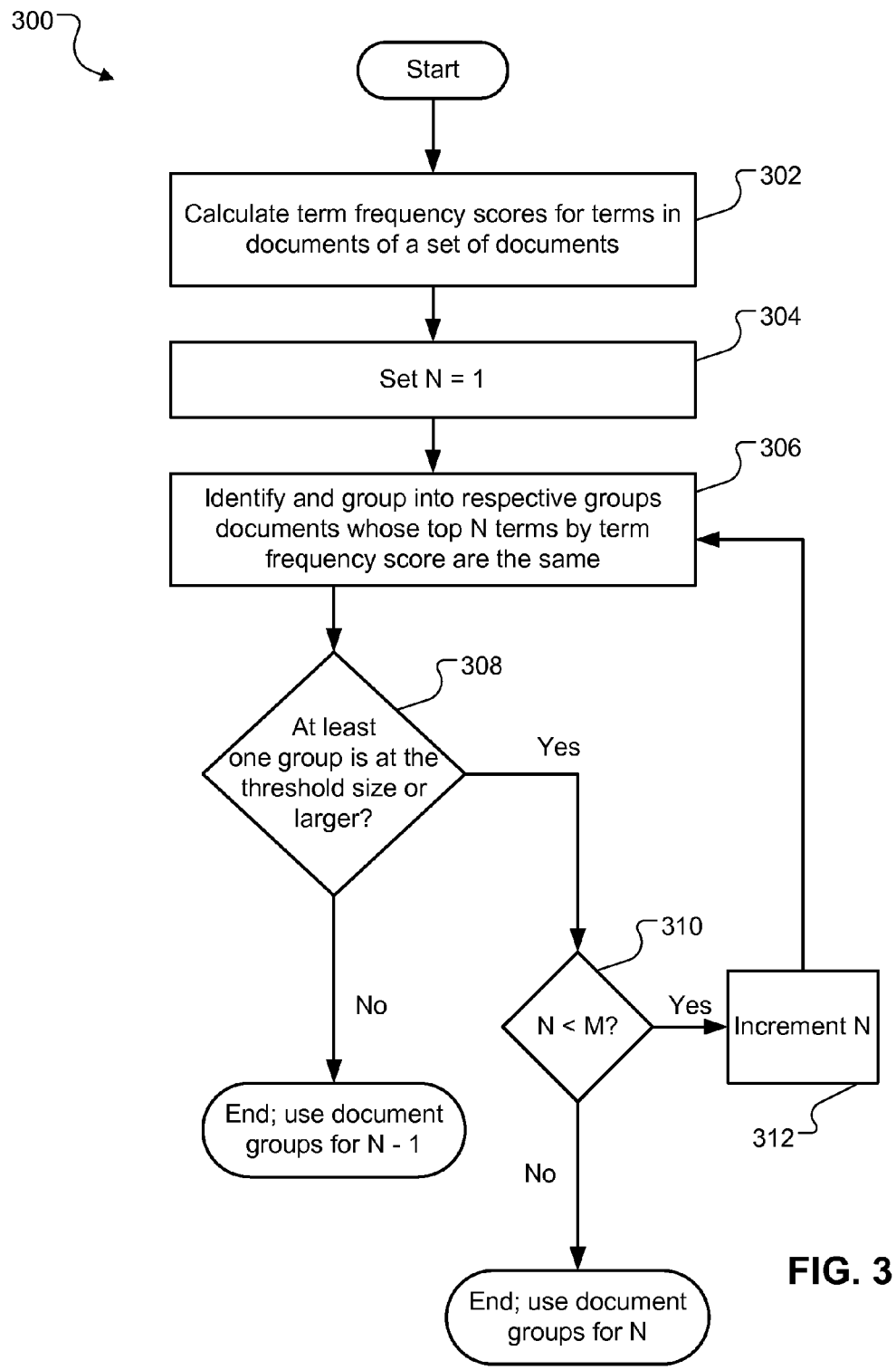
FIG. 3 is a flow diagram illustrating an example process for grouping documents that have common high-scoring terms by term frequency score.

FIG. 3 illustrates an example process 300 for grouping documents that have common high-scoring terms by term frequency score. For convenience, process 300 will be described in reference to a system (e.g., document processing system 104) that performs the process.

Term frequency scores are calculated for terms appearing in one or more documents of a set of documents (302). In some implementations, the set of documents are one or more documents (e.g., web pages) from a particular website (e.g., web pages under a specified domain or under a specified domain and path) that are available in document repository 116 and/or obtained from a content host 102 corresponding to the website. For example, the set of documents can be web pages from the specified website that are available in document repository 116 as of a particular date and time. Term frequency scoring module 110 can score terms occurring in the documents of the website using a measure of term frequency, e.g., term frequency-inverse document frequency (TF-IDF). Generally, TF-IDF is a statistical measure used to evaluate how important a word is to a document in a collection or corpus. The importance increases proportionally to the number of times a word appears in the document but is offset by the frequency of the word in the corpus. In some implementations, the terms are scored by a modified TF-IDF measure. In some implementations, the formula for the modified TF-IDF score for a term in a document is:

$$\text{Modified } TF-IDF = (n+S)\log\frac{D}{d} \quad (1)$$

where n is the number of times the term appears in the document, S is the number of times the term appears in the documents of the set of documents, D is the total number of documents in a corpus of documents from content hosts 102 (e.g., documents in document repository 116), and d is the number of documents within the corpus of documents from content hosts 102 that include the term. In some implementations, the corpus of documents from content hosts 102 represent "all" documents on the World Wide Web (more particularly, at least the documents on the Web that have been crawled and indexed). Equation 1 biases the scores toward content that is shared in multiple documents (e.g., text that are common throughout the multiple documents, such as boilerplate text).

In some implementations, if n for a particular term is 0, then the modified TF-IDF for that term is 0. Otherwise, the modified TF-IDF for the term is calculated in accordance with Equation 1. Thus, the modified TF-IDF calculation can be expressed as follows:

If (n==0)
  modified TF-IDF=0;
else
  modified TF-IDF=Equation 1.

In this example, a value N is set to a predetermined number (e.g., 1) (304). N is a value that specifies how many top-scoring terms two documents needs to have in common in order for the two documents to be grouped together.

Documents that have the same top N terms by term frequency score are identified and grouped together (306). Document grouping and clustering module 108 can form one or more groups of documents by grouping documents with the same top N terms by score.

In some implementations, to group two documents, the top N terms by score have to be the same and in the same score order in both documents. Thus, for example, if the top 3 terms by score (where N=3) for Documents 1, 2, and 3, respectively, are the following:

Document 1: A, B, C;
Document 2: A, B, C;
Document 3: B, A, C;

then Documents 1 and 2 can be grouped together but Document 3 will not be grouped with either Document 1 or 2; though the top N (3) scoring terms are the same for the three documents, the ordering of the terms is different in Document 3 than in Documents 1 and 2. In some implementations, the order is not considered; Documents 1, 2, and 3 are grouped together because they have the same top 3 terms despite the difference in order.

The sizes of the document groups are compared to a threshold minimum size (308). In some implementations, there is a predefined threshold document group size, i.e., threshold minimum number of documents in a group. This minimum document group size can be a size that ensures that a pattern identified from a document group is of sufficient quality. In some implementations, the threshold minimum is a constant (e.g., 4). In some other implementations, the threshold minimum is a predefined percentage of the number of documents in the set of documents.

If none of the document groups identified in step 306 for the particular value of N is at least the threshold size (308—No), then process 300 ends and the document groups identified for the last value of N (e.g., N−1) are used for identifying pattern strings. If at least one of the document groups identified in step 306 for the particular value of N has a size that is at least the threshold minimum size (308—Yes), the process continues. From here, if N is equal to or greater than M, where M is a predefined integer that is 1 or greater (310—No), the process ends and the document groups identified for the current value of N (up to N=M) are used for identifying pattern strings. In some implementations, M=100. If N is less than M (310—Yes), N is incremented (e.g., increment by 1), and the document grouping operation (step 306) is performed again using the new value of N.

As N increased in value, the sizes of the document groups stay the same or decrease. In process 300, a largest value of N is identified such that there is at least one document group identified for that value of N that is at least the threshold minimum size. Further, the value M imposes a ceiling on N, and thus imposes a ceiling on the number of grouping iterations within process 300 (or more particularly, step 306). This ceiling can keep process 300 from consuming too much computing time and/or resources due to an excessive number of iterations.

In some other implementations, an optimal N is identified by identifying document groups for all integers values of N between 1 and M, inclusive. Each value of N is assigned a score that is a product of N and the size of the largest document group for that value of N. For example, if we have the following largest document group sizes for particular values of N:

N=1→largest document group size is 1000;
N=2→largest document group size is 500;
N=3→largest document group size is 500;
N=4→largest document group size is 10;
N>4→largest document group size is below the threshold minimum (these values of N would be disregarded).

In this example, the score for N=1 is 1000*1=1000. The score for N=2 is 500*2=1000. The score for N=3 is 500*3=1500. The score for N=4 is 10*4=40. Here, N=3 has the highest score, and the document groups for N=3 are used for the identification of pattern strings. In some implementations, N=0 for the initial iteration, where all the documents are grouped together because there are no terms to compare. All the documents start in the same group. If there are no matches when N=1, then N=0 can be used.

In some implementations, process 300 is implemented using a procedure described by the pseudocode in Table I below:

TABLE I

```
for N = 1 to M {
    int max_fingerprint_count = 0;
    for each document d {
        string terms;
        // compute the fingerprint of the top N tfidf terms
        for i = 1 to N {
            term = GetTfidfTerm (d, i);
            terms += ":" + term;
        }
```

TABLE I-continued

```
        f = Fingerprint(terms);
        IncrementFingerprintCount(f);
        if (GetFingerprintCount(f) > max_fingerprint_count)
            max_fingerprint_count = GetFingerprintCount(f);
    } // for each document
    if (max_fingerprint_count >= MIN_REQUIRED_CLUSTER_SIZE) {
        STOP iterations;
        // cluster has max_fingerprint_count documents and
uses the top N tfidf terms
    }
}
```

The process described in Table I above can iterate up to M (e.g., 100) times. For each document, a fingerprint of the top N terms in the document by term frequency score is computed. For example, a fingerprint of the top 5 terms can be a hash of a string formed by concatenating the top 5 terms in the document by term frequency score and a number of term separators (e.g., ":"). In some implementations, the iterations stop when max_fingerprint_count reaches a threshold (MIN_REQUIRED_CLUSTER_SIZE) or when N=M.

The largest group that is at least the threshold minimum size among the document groups generated in block 306 is used in the identification of a pattern string in block 204 (FIG. 2).

As described above in reference to block 204 of FIG. 2, a pattern string that is satisfied by at least a subset of the documents in a document group can be identified. In some implementations, a pattern string can be identified, using a pattern language, such that the URLs of at least a subset of the documents in a document group match the pattern string; the documents whose URLs match the pattern string satisfy the pattern string. An example pattern language is described below.

Example Pattern Language

An example pattern language for identifying pattern strings that match URLs defines a number of elements. A pattern string includes one or more of these elements, each of which can match one or more segments of a URL.

In accordance with the example pattern language, a URL can be segmented into segments at predefined segment dividers. In some implementations, the segment dividers are "/" and "?" characters. For example, the URL "2007/business?bar=3" is divided into three segments: "2007," "business," and "bar=3".

In this example, the pattern language defines three possible elements for a segment:
1. "*"—a wildcard that matches a segment and all subsequent segments; can only be the terminal element in a pattern string;
2. "< >"—a wildcard that matches a single segment; and
3. "string"—matches the segment string; exact string match for a single segment.

Thus, for the URL "2007/business?bar=3", the following example pattern strings match the URL "2007/business?bar=3":
1. "*" (this pattern string matches any URL);
2. "< >/< >/< >" (this pattern string matches a URL that has exactly three segments);
3. "< >/< >/*" (this pattern string matches a URL that has at least 2 segments);
4. "2007/< >/*" (this pattern string matches a URL that has at least 2 segments, with the first segment being the string "2007");

5. "< >/business/*" (this pattern string matches a URL that has at least 2 segments, with the second segment being the string "business");

6. "2007/< >/bar=3" (this pattern string matches a URL that has the string "2007" as the first segment, has a second segment that can be any string, and has the string "bar=3" as the third segment).

The following example pattern strings do not match the URL "2007/business?bar=3":

1. "< >" (the URL has 3 segments, the pattern string here matches a 1-segment URL);

2. "< >/< >" (the URL has 3 segments, the pattern string here matches a 2-segment URL);

3. "*/< >" (this pattern string is invalid; "*" can only be a terminal element in a pattern string).

In some implementations, pattern strings can be identified using a greedy algorithm. For example, URLs of documents in a document group can be evaluated from left to right, segment by segment. For the first segment, the element can be "*", "<>" or the string that appears most frequently as the first segment in the URLs. Subsequent segments can be evaluated recursively.

In some implementations, an initial pruning step is included in the identification of the pattern string. In the pruning step, a string that is the most common in any segment is identified. For example, if the URLs are:

/black/bar;
/black/foo;
/black/foo;
/white/foo;
/white/foo;

then the most common string is "foo." Assuming that the string "foo" appears in at least a threshold number of URLs (e.g., MIN_REQUIRED_CLUSTER_SIZE), URLs that don't match can be ignored (in the above example, the URL "/black/bar" would be ignored). A pattern string can be determined using the URLs with the string "foo." For example, a pattern string that matches the four URLs above with the string "foo" is "/< >/foo".

More generally, a pattern string can be identified in accordance with a minimum description length (MDL) principle. The MDL principle can be used as a way to score patterns to decide which pattern is best, taking into account two competing goals: that the pattern be as precise as possible (e.g., includes more fixed strings than wildcards), and that the pattern match as many URLs as possible. The MDL score can be the number of bits in the pattern, plus the number of bits for encoding all the samples that match the pattern. The part of the sample that is matched by a wildcard pattern element can be represented explicitly. The part of the sample that is matched by an explicit part of the pattern does not have to be represented explicitly. For example, samples may be as follows:

green
green
green.

The pattern "*" needs one letter, '*' (represented by a number of bits) and "green" needs 5 letters (g-r-e-e-n) for each of the 3 samples. Given this pattern, the MDL score is 1+3*5=16. Now consider the pattern "green." The pattern "green" has five letters. But given the repeating pattern in this example, each sample can be encoded for free (e.g., 0 extra letters). The total score for this sample would be 5+0*3=5. Five is lower than 16, so it is a better MDL score.

The MDL pattern may match many more URLs than those in the document group generated by block 306. Since most web sites store pages with similar content (e.g., business stories) in similar URLs (e.g., these URLs all start with the same prefix), the generated MDL pattern is likely to match URLs with similar content even if those URLs did not belong to the same document group.

The process 300 depicted in FIG. 3 takes linear time, which means that the number of basic operations that process 300 executes is proportional to K, which is the number of documents in the input set of documents. Step 302 computes the modified TF-IDF score of the documents in the set. A practical crawling system sets a fixed upper limit on the size of the documents. Documents longer than this threshold can be truncated. Extracting all terms from a document takes time proportional to the document size. Counting the number of times each term appears in the document is also proportional to the document size. Counting the number of times each term appears in the set of documents is proportional to the size of the document set times the document size. We assume that a table containing the frequency of every term in the corpus already exists. Computing the logarithm of any number takes a fixed number of steps using well-known numerical approximation for the logarithm function. The output of step 302 is a sorted list of terms based on their modified TF-IDF score. Sorting the terms of a document takes a time proportional to $T*\log(T)$, where T is the number of terms in the document. Since T is less than the fixed maximal document size, the time to sort the terms of any single document is limited by a constant. Thus the time to compute step 302 is proportional to K times the maximal document size. Since the maximal document size is a constant, albeit a large one, the time to compute step 302 is proportional to K.

Step 306 identifies a group of documents whose top N terms are the same. One way to implement this step is with the process depicted in Table I. Concatenating the top N terms of the document takes time proportional to N times the maximal term size. Many practical systems set a fixed upper limit on term sizes. The time to compute the fingerprint of a string is proportional to the size of the string. Thus the time to concatenate the top N terms and compute a fingerprint of the concatenated terms is proportional to N. The time to increase the count of a given fingerprint is a constant assuming that an appropriate data structure is used (e.g., a hash table). Thus the time to compute the process of Table I is proportional to K (the number of documents) times N. Since N is limited by the constant M, the time to compute the process of Table I is also proportional to K.

Figure 4:
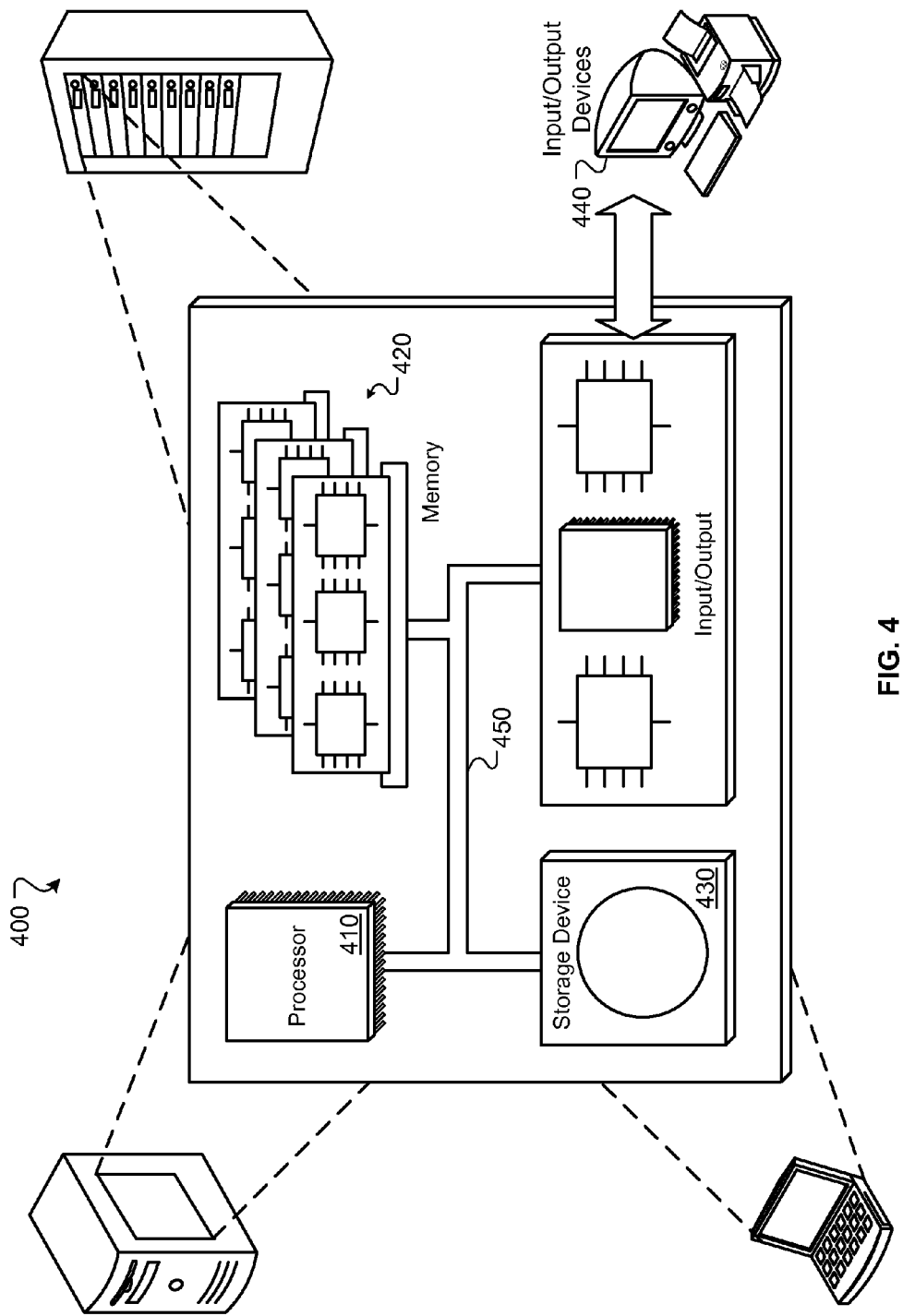
FIG. 4 is a block diagram illustrating a generic computer system that can be used to implement the processes of FIGS. 2 and 3.

FIG. 4 is a schematic diagram of a generic computer system 400. The system 400 can be used for practicing operations described in association with the processes 200 and 300. The system 400 can include a processor 410, a memory 420, a storage device 430, and input/output devices 440. Each of the components 410, 420, 430, and 440 are interconnected using a system bus 450. The processor 410 is capable of processing instructions for execution within the system 400. Such executed instructions can implement one or more components of document processing system 104, for example. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 is a computer readable medium such as volatile or non-volatile memory that stores information within the system 400. The memory 420 could store data structures representing document repository 116, for example. The storage device 430 is capable of providing persistent storage for the system 400. The storage device 430 may be a floppy disk device, a hard disk device, an optical disk device, or a tape device, or other suitable persistent storage means. The input/output device 440 provides input/output operations for the system 400. In one implementation, the input/output device 440 includes a keyboard and/or pointing device. In another implementation, the input/output device 440 includes a display unit for displaying graphical user interfaces.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    identifying a plurality of documents, from a set of documents, wherein each of the plurality of documents include a top N terms, wherein the top N terms are the same for each of the plurality of documents, wherein the top N terms are based on respective term frequency scores, and wherein N is an integer;
        identifying at least a subset of the identified documents that satisfy a pattern string; and
    forming a document cluster from at least the subset of the identified documents.

2. The method of claim 1, wherein identifying a plurality of documents, comprises:
    for each document in the set of documents:
        determining term frequency scores for terms in the respective document; and
        ordering the terms in the respective document by term frequency score; and
    identifying the plurality of documents in the set of documents whose respective top N terms by term frequency score are the same.

3. The method of claim 2, wherein identifying comprises identifying a plurality of documents, from the set of documents, whose respective top N terms by term frequency score are the same and the ordering of the respective top N terms by term frequency score are the same.

4. The method of claim 1, wherein N is greater than or equal to 1.

5. The method of claim 1, wherein the method is iterated up to M times, wherein M is an integer; and wherein N is incremented for each iteration.

6. The method of claim 5, wherein N is greater than or equal to 1 and less than or equal to M.

7. The method of claim 1, wherein the set of documents are documents belonging to a same website.

8. The method of claim 1, wherein the pattern string comprises a string that is satisfied by Universal Resource Locators of the documents in the subset of the identified documents.

9. The method of claim 1, wherein identifying a pattern string that is satisfied by at least a subset of the identified documents comprises identifying a pattern string that is satisfied by at least a subset of the identified documents in accordance with a pattern language.

10. A system, comprising:
    one or more processors;
    memory; and
    instructions stored in the memory and configured for execution by the one or more processors, the instructions comprising instructions to:
        identify a plurality of documents, from a set of documents, wherein each of the plurality of documents include a top N terms, wherein the top N terms are the same for each of the plurality of documents, wherein the top N terms are based on respective term frequency scores, and wherein N is an integer;
        identify at least a subset of the identified documents that satisfy a pattern string; and
        form a document cluster from at least the subset of the identified documents.

11. A non-transitory computer readable medium having stored thereon instructions which, when executed by one or more processors, causes the processors to perform operations comprising:
    identifying a plurality of documents, from a set of documents, wherein each of the plurality of documents include a top N terms, wherein the top N terms are the same for each of the plurality of documents, wherein the top N terms are based on respective term frequency scores, and wherein N is an integer;
    identifying at least a subset of the identified documents that satisfy a pattern string; and
    forming a document cluster from at least the subset of the identified documents.

12. A system, comprising:
    memory;
    one or more processors;
    means for identifying a plurality of documents, from a set of documents, wherein each of the plurality of documents include a top N terms, wherein the top N terms are the same for each of the plurality of documents, wherein the top N terms are based on respective term frequency scores, and wherein N is an integer;
    means for identifying a pattern string that is satisfied by at least a subset of the identified documents; and
    means for forming a document cluster from at least the subset of the identified documents.

13. A system comprising:
    one or more processors;
    memory; and
    instructions stored in the memory and configured for execution by the one or more processors, the instructions comprising instructions to:
    for each document in a set of documents;
        determining term frequency scores for terms used in the document;
        ordering the terms used in the document by the corresponding term frequency score;
        identifying a first subset of documents from the set of documents, wherein each of the first subset of documents include a top N terms, wherein the top N terms are the same for each of the first subset of documents, wherein the top N terms are based on respective term frequency scores, and whose ordering of the respective top N terms by term frequency score are the same, where N is an integer;
        identifying a second subset of documents from the first set of documents that satisfy a pattern string; and
        forming a cluster from at least the second subset of documents.

14. The system of claim 13, wherein the set of documents are documents belonging to a same website.

15. The system of claim 13, wherein the pattern string comprises a string that is satisfied by Universal Resource Locators of the documents in the second subset of the identified documents.

16. The system of claim 13, wherein identifying a pattern string that is satisfied by at least a second subset of the identified documents comprises identifying a pattern string that is satisfied by at least a subset of the identified documents in accordance with a pattern language.

17. The system of claim 10, wherein identifying a plurality of documents, comprises:
for each document in the set of documents:
determining term frequency scores for terms in the respective document; and
ordering the terms in the respective document by term frequency score; and
identifying the plurality of documents in the set of documents whose respective top N terms by term frequency score are the same.

18. The system of claim 17, wherein identifying comprises identifying a plurality of documents, from the set of documents, whose respective top N terms by term frequency score are the same and the ordering of the respective top N terms by term frequency score are the same.

19. The system of claim 10, wherein N is greater than or equal to 1.

20. The system of claim 10, wherein the method is iterated up to M times, wherein M is an integer; and wherein N is incremented for each iteration.

21. The system of claim 20, wherein N is greater than or equal to 1 and less than or equal to M.

22. The system of claim 10, wherein the set of documents are documents belonging to a same website.

23. The system of claim 10, wherein the pattern string comprises a string that is satisfied by Universal Resource Locators of the documents in the subset of the identified documents.

24. The system of claim 10, wherein identifying a pattern string that is satisfied by at least a subset of the identified documents comprises identifying a pattern string that is satisfied by at least a subset of the identified documents in accordance with a pattern language.

25. The non-transitory computer readable medium of claim 11, wherein identifying a plurality of documents, comprises:
for each document in the set of documents:
determining term frequency scores for terms in the respective document; and
ordering the terms in the respective document by term frequency score; and
identifying the plurality of documents in the set of documents whose respective top N terms by term frequency score are the same.

26. The non-transitory computer readable medium of claim 25, wherein identifying comprises identifying a plurality of documents, from the set of documents, whose respective top N terms by term frequency score are the same and the ordering of the respective top N terms by term frequency score are the same.

27. The non-transitory computer readable medium of claim 11, wherein N is greater than or equal to 1.

28. The non-transitory computer readable medium of claim 11, wherein the method is iterated up to M times, wherein M is an integer; and wherein N is incremented for each iteration.

29. The non-transitory computer readable medium of claim 28, wherein N is greater than or equal to 1 and less than or equal to M.

30. The non-transitory computer readable medium of claim 11, wherein the set of documents are documents belonging to a same website.

31. The non-transitory computer readable medium of claim 11, wherein the pattern string comprises a string that is satisfied by Universal Resource Locators of the documents in the subset of the identified documents.

32. The non-transitory computer readable medium of claim 11, wherein identifying a pattern string that is satisfied by at least a subset of the identified documents comprises identifying a pattern string that is satisfied by at least a subset of the identified documents in accordance with a pattern language.

\* \* \* \* \*